US007013826B2

(12) United States Patent
Maloney et al.

(10) Patent No.: US 7,013,826 B2
(45) Date of Patent: Mar. 21, 2006

(54) HYBRID CATAMARAN AIR CUSHION SHIP

(75) Inventors: Kenneth J. Maloney, New Orleans, LA (US); Charles S. Whipple, Jr., Slidell, LA (US)

(73) Assignee: Textron Innovations Inc., Providence, RI (US)

( * ) Notice: Subject to any disclaimer, the term of this patent is extended or adjusted under 35 U.S.C. 154(b) by 148 days.

(21) Appl. No.: 10/661,113

(22) Filed: Sep. 12, 2003

(65) Prior Publication Data

US 2004/0112268 A1 Jun. 17, 2004

Related U.S. Application Data

(60) Provisional application No. 60/410,131, filed on Sep. 12, 2002.

(51) Int. Cl.
*B63B 1/32* (2006.01)

(52) U.S. Cl. .................................... 114/288; 114/67 A

(58) Field of Classification Search ................ 114/288, 114/289, 67 A; 180/126
See application file for complete search history.

(56) References Cited

U.S. PATENT DOCUMENTS

| | | | | |
|---|---|---|---|---|
| 1,976,046 A | | 10/1934 | Tietjens | |
| 2,405,115 A | | 8/1946 | Creed | |
| 3,065,723 A | | 11/1962 | Tulin | |
| 3,077,173 A | | 2/1963 | Lang | |
| 3,141,436 A | * | 7/1964 | Cathers et al. | 180/120 |
| 3,458,007 A | * | 7/1969 | Todd | 180/128 |
| 3,621,932 A | | 11/1971 | Tattersall et al. | |
| 3,917,022 A | | 11/1975 | Brooks, Jr. | |
| 3,987,865 A | | 10/1976 | Krupp | |
| 4,469,334 A | | 9/1984 | Le Comte | |
| 4,489,667 A | | 12/1984 | Moore et al. | |
| 4,506,618 A | | 3/1985 | Chaplin | |
| 4,535,712 A | | 8/1985 | Matthews | |
| 4,543,901 A | | 10/1985 | Stringer | |
| 4,646,866 A | | 3/1987 | Bertrand et al. | |
| 4,660,492 A | | 4/1987 | Schlichthorst et al. | |
| 4,708,077 A | | 11/1987 | Balquet et al. | |
| 4,714,041 A | | 12/1987 | Jaffre et al. | |
| 4,739,719 A | | 4/1988 | Burg | |
| 4,767,367 A | | 8/1988 | Stringer | |
| 5,651,327 A | * | 7/1997 | Whitener | 114/271 |
| 5,711,494 A | | 1/1998 | Saiz | |
| 5,934,215 A | | 8/1999 | Burg | |
| 6,293,216 B1 | | 9/2001 | Barsumian | |
| 6,439,148 B1 | | 8/2002 | Lang | |
| 6,526,903 B1 | | 3/2003 | Robinson et al. | |
| 6,609,472 B1 | | 8/2003 | Burg | |
| 2003/0000440 A1 | | 1/2003 | Burg | |

OTHER PUBLICATIONS

John Lewthwaite, “The PACSCAT Concept and its application to Fast Landing Craft”, presented at MACC Multi Agency Craft Conference 2002, The Pulse of Technology, Jun. 18–20, 2002, Naval Amphibious Base Little Creek, Norfolk (19 pages).

* cited by examiner

*Primary Examiner*—Jesus D. Sotelo
(74) *Attorney, Agent, or Firm*—Garvey, Smith, Nehrbass & Doody, L.L.C.; Seth M. Nehbass; Charles C. Garvey, Jr.

(57) ABSTRACT

A vessel (10) designed to operate efficiently as both a catamaran and air cushion vessel can travel at low speed (e.g. Froude number (Fn)=0–0.3) in a catamaran or displacement mode and at high speed (e.g. Froude numbers (Fn)=0.3 or more) in an air cushion or dynamically supported mode. The vessel (10) includes molded catamaran hulls (11, 12) with parabolic waterlines, a flexible, air cushion seal system (16, 17), surface piercing propellers (20) and a propulsion system (e.g. combined diesel and gas turbine). There are preferably auxiliary gas turbines for generating lift air pressure. Forward mounted independently stabilizing foils (30), can optionally facilitate ride stabilization and load compensation at high and low speeds. The foils also generate transverse roll forces to improve high speed maneuvering.

23 Claims, 5 Drawing Sheets

FIG. I.

HYBRID CATAMARAN AIR CUSHION SHIP

CROSS-REFERENCE TO RELATED APPLICATIONS

Priority of U.S. Provisional Patent Application Ser. No. 60/410,131, filed 12 Sep. 2002, incorporated herein by reference, is hereby claimed.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to catamaran air cushion ships. More particularly, the present invention relates to an improved surface effect ship or air cushion ship with a catamaran hull that enables both low and high speeds with improved efficiency.

2. General Background of the Invention

The typical side hull geometry that has been employed by surface effect ships is a prismatic, hard-chine planing hull. These types of hulls are inefficient at developing lift and have very high wave making drag characteristics when the ship is off cushion in the displacement mode. Their primary advantages comes from their ease of production and their tendency to introduce a degree of dynamic stability at high speeds.

In general, catamaran air cushion ships are known. Examples are listed in the following table. The table also lists some propeller related art.

TABLE I

| Patent Number | Title | Issue Date |
|---|---|---|
| 1,976,046 | Waterfoil | Oct. 9, 1934 |
| 2,405,115 | Floating Structure | Aug. 6, 1946 |
| 3,065,723 | Supercavitating Hydrofoils | Nov. 27, 1962 |
| 3,077,173 | Base Ventilated Hydrofoil | Feb. 12, 1963 |
| 3,621,932 | Gas-Cushion Vehicles | Nov. 23, 1971 |
| 3,917,022 | Twin Cushion Surface Effect Vehicle | Nov. 4, 1975 |
| 3,987,865 | Gas-Cushion Vehicle Skirt | Oct. 26, 1976 |
| 4,469,334 | Sealing System For The Air Cushion Of An Air-Cushion Vessel | Sep. 4, 1984 |
| 4,489,667 | Surface Effect Ship Seals | Dec. 25, 1984 |
| 4,506,618 | Propeller And Keel Arrangement For Surface Effect Ships | Mar. 26, 1985 |
| 4,535,712 | Variable Air Cushion Mode Vehicle | Aug. 20, 1985 |
| 4,543,901 | Surface Effect Ship Air Cushion Seal System | Oct. 1, 1985 |
| 4,646,866 | Surface Effect Type, Side Keel Vessel Fitted With An Improved Forward Buoyancy Cushion Seal Apparatus | Mar. 3, 1987 |
| 4,660,492 | Catamaran Air Cushion Water Vehicle | Apr. 28, 1987 |
| 4,708,077 | Hull Shapes For Surface Effect Ship With Side Walls And Two Modes Of Operation | Nov. 24, 1987 |
| 4,767,367 | Integrated Combination Propeller Drive Shaft Fairing and Water Intake Sea Chest Arrangement, For High Speed Operating Marine Craft | Aug. 30, 1988 |
| 5,711,494 | Aero-Hydroglider | Jan. 27, 1998 |
| 5,934,215 | Stabilized Air Cushioned Marine Vehicle | Aug. 10, 1999 |
| 6,293,216 | Surface Effect Ship (SES) Hull Configuration Having Improved High Speed Performance and Handling Characteristics | Sep. 25, 2001 |
| 6,439,148 | Low-Drag, High-Speed Ship | Aug. 27, 2002 |

Incorporated herein by reference are U.S. Pat. Nos. 4,767,367; 6,293,216; and 6,439,148. These three patents relate generally to surface effect ships or hovercraft.

BRIEF SUMMARY OF THE INVENTION

The present invention comprises a vessel designed to operate as both a catamaran and an air cushion vessel. This hybrid catamaran air cushion ship has several advantages over previous air cushion and surface effect ship designs. It will be able to efficiently travel at low speeds (Froude number (Fn)=about 0–0.3) in the catamaran or displacement mode. It will also have the ability to operate in the air cushion or dynamically supported mode at high speeds (Froude number (Fn)=about 0.3 and greater) and with the ability to operate at all speeds.

It will be able to efficiently travel at low speeds (e.g. about 0–20 knots (0–37 km/hour)) in the catamaran or displacement mode. It will also have the ability to operate in the air cushion or dynamically supported mode at high speeds (e.g. about 50 knots (93 km/hour) and greater) and with the ability to operate at all speeds. The air cushion can also be used to reduce the ship's already shallow static draft from, for example, approximately five meters to less than one meter. This ability decreases underwater signatures and has been proven in several full-scale tests to improve survivability in the event of a mine encounter.

This design concept departs from previous surface effect ships in one key area. With very few exceptions, the surface effect vessels built to date have been designed to optimize high speed performance. The vessel of the present invention will capitalize on the strengths of both the air cushion and catamaran types of vessels. It will be able to operate efficiently at high speeds, but will also be able to operate efficiently in the lower speed regime.

This dual mode operation capability will enable the ship to adapt to sea conditions and operate for extended periods without refueling.

The vessel of the present invention features molded catamaran hulls with parabolic waterlines, a flexible, retractable air cushion seal system, an independently powered lift fan (air cushion) system, surface piercing propellers (optionally controllable pitch) and a power plant for each propeller (e.g. combined diesel and gas turbine propulsion system).

Lift air pressure can be generated, for example, by auxiliary gas turbines or diesels. Forward mounted lifting foils will facilitate ride stabilization and load compensation, at high and low speeds. These foils will also be used to generate transverse roll forces to improve high speed maneuvering. Very low speed, quiet maneuvering can be assisted by a retractable, omni-directional thruster unit.

The vessel of the present invention can displace e.g. up to 2000 long tons, but is scalable and may be manifested in lesser or greater displacements. A vessel in this displacement range, can be, for example, approximately 90 m in length, with about a 30 m beam.

The concept of the hybrid catamaran air cushion ship of the present invention combines an improved, specially configured catamaran design with equally viable concepts in air cushion vehicle technology. The craft of the present invention is as efficient as possible for low speed operations while giving it the reduced drag advantages enjoyed by dynamically supported, high speed, air cushion vessels. To accomplish this task effectively, the present invention provides several features.

The side hulls of the present invention are preferably molded (rounded) forms featuring parabolic waterlines and semi-elliptical cross sections (see FIGS. 6–7). These forms minimize the characteristic wave trains associated with low speeds and have been shown to have superior drag characteristics at both low and high speeds.

The present invention employs small lifting surfaces to provide load compensation, ride control and high-speed stabilization. These surfaces can take the form of two, independently controlled, wing sections mounted port and starboard below the waterline on the side hulls (e.g., inboard and forward). Their primary task is to provide ride control at all speeds but they will also provide high-speed stability, enhancing both directional control and maneuvering.

To take fill advantage of the low drag side hulls that the vessel of the present invention will possess, flexible air cushion seals (bow and stern) that can be retracted from the water. When the craft is not in the air cushion mode, these seals could cause additional viscous drag and limit maneuverability. The seals can be retracted and stowed above the water level, for example under the wet deck structure. This will reduce drag in the displacement mode, and improve seal life. The seals can preferably be deployed or retracted rapidly and remotely, without manual intervention from the crew.

A hybrid hullform was designed, using slender forms for the sidehulls rather than the long planing bodies used for most surface effect ships. The sidehull depth was set to provide a cross structure (wet deck) clearance (of e.g. two meters) above the water, enabling operation as a catamaran, with some allowance for future weight growth.

The lift system and air cushion seals were designed to provide additional wet deck clearance (of, e.g., five meters) when on-cushion (when the vessel is operated in conjunction with a pressurized air cushion), resulting in a low keel draft (e.g., about one meter) in calm water conditions. Although slightly higher in calm water drag than a conventional surface effect ship (SES), this configuration will operate with essentially the same sidehull wetted area in higher sea states (e.g., waves up to about two meters), and hence will retain performance.

The propulsor is preferably designed for high efficiency in both a low speed mode and a high speed mode. Initial studies considered both waterjets and propellers as candidate propulsors. It became apparent that propellers were preferred as they could offer certain desired performance characteristics across the entire speed range. To be efficient at high speeds, a propeller has to operate in the partially submerged mode to avoid prohibitively high drag from the hub and related support structure. Because of the change in keel immersion as the ship goes from off cushion to on cushion, a stern-mounted propeller can be arranged to naturally operate fully submerged in the catamaran mode and surface piercing in the SES mode.

BRIEF DESCRIPTION OF THE SEVERAL VIEWS OF THE DRAWINGS

For a further understanding of the nature, objects, and advantages of the present invention, reference should be had to the following detailed description, read in conjunction with the attached drawings which are identified as follows.

DETAILED DESCRIPTION OF THE INVENTION

Figure 1:
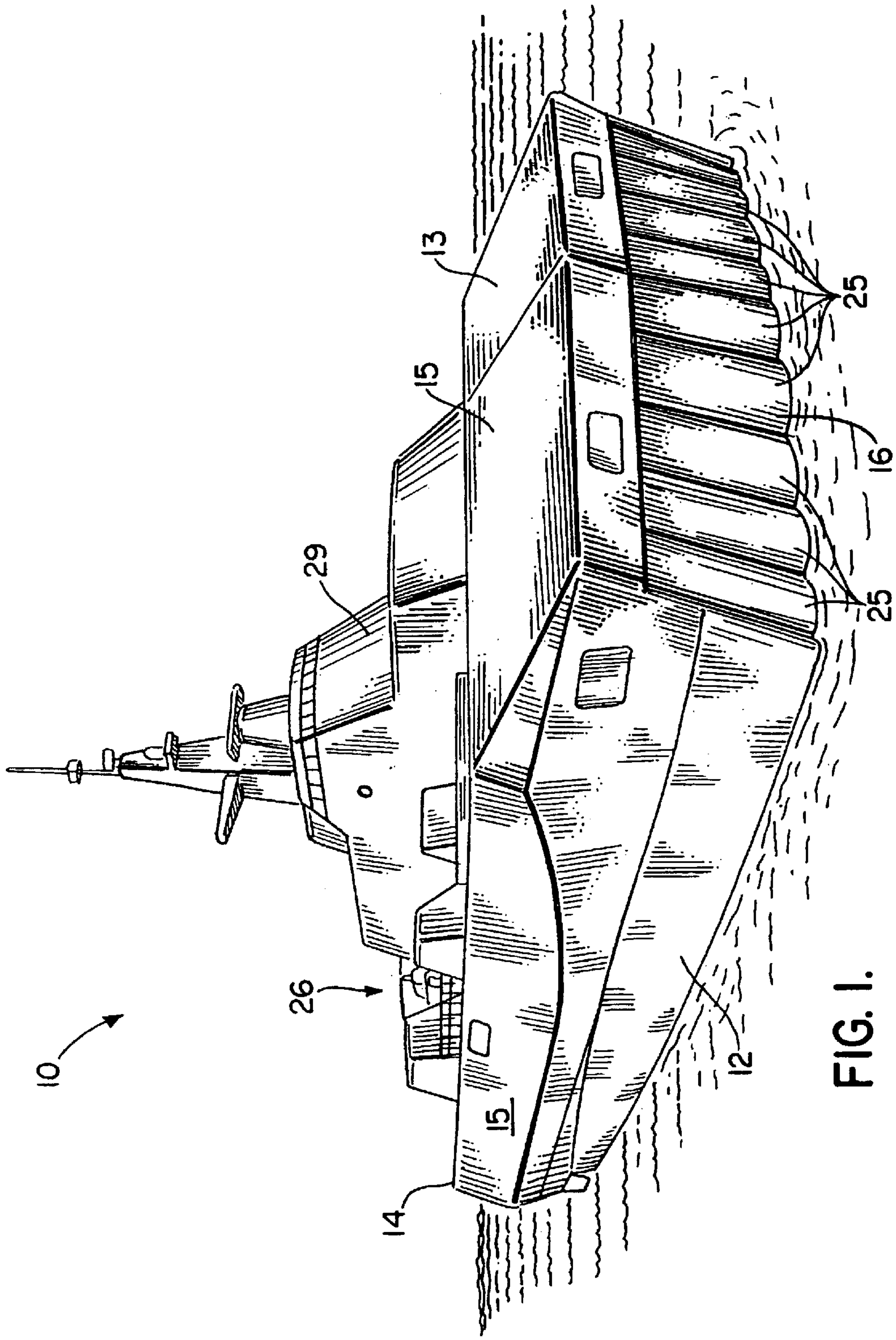
FIG. 1 is a perspective view of the preferred embodiment of the apparatus of the present invention.

The vessel of the present invention is designed to operate as both a catamaran and air cushion vessel. The hybrid catamaran air cushion ship of the present invention is designated generally by the numeral 10 in FIGS. 1–4. Vessel 10 has several advantages over previous air cushion and surface effect ship designs. It will be able to efficiently meet the demands of the low speed (Froude number 0–0.3) requirements in the catamaran or displacement mode (see first water line, numeral 27 in FIG. 2). The vessel 10 of the present invention will also have the ability to operate in the air cushion or dynamically supported mode, (see second water line, numeral 28 in FIG. 3) where it will meet the high speed (Froude numbers 0.3 and higher) performance targets and provide the ability to operate in extreme sea states.

Figure 2:
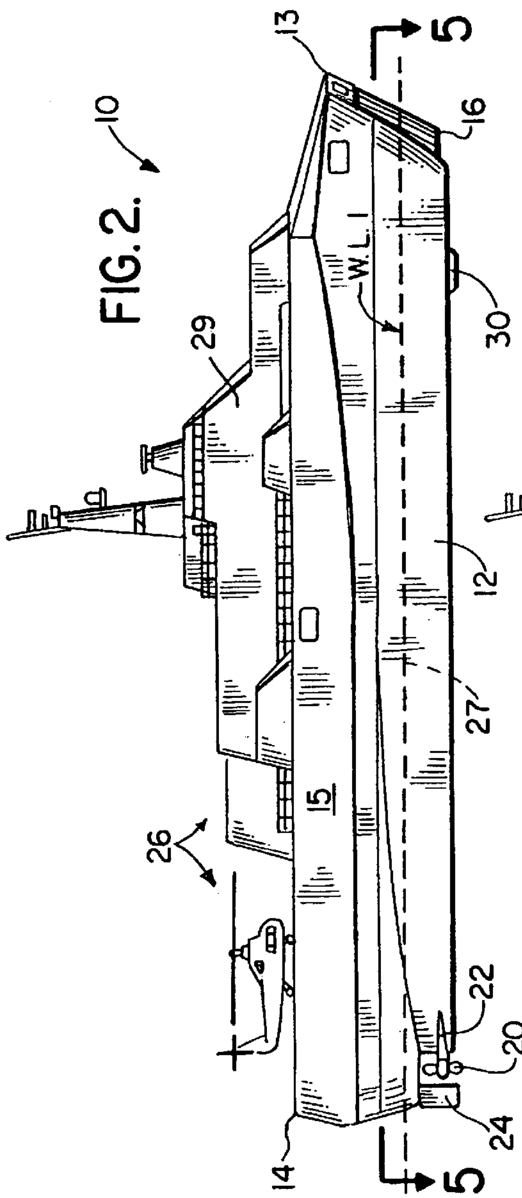
FIG. 2 is a side view of the preferred embodiment of the apparatus of the present invention showing the displacement mode.

Vessel 10 will be able to efficiently meet the demands of the low speed (e.g. 0–20 knots (0–37 km/hour)) requirements in the catamaran or displacement mode (see first water line, numeral 27 in FIG. 2). The vessel 10 of the present invention will also have the ability to operate in the air cushion or dynamically supported mode, (see second water line, numeral 28 in FIG. 3) where it will meet the high speed (e.g. 50 knots (93 km/hour) or higher) performance targets and provide the ability to operate in extreme sea states.

The air cushion can also be used to reduce the ship's static draft (from for example approximately five meters to for example less than one meter). This ability decreases underwater signatures and has been proven in several full-scale tests to improve survivability in the event of a mine encounter.

Hybrid catamaran air cushion ship 10 has a catamaran hull defined by port hull 11 and starboard hull 12. The vessel 10 provides a bow 13 and stern 14. Platform 15 is connected to and spans between the port hull 11 and starboard hull 12. The catamaran hull and platform 15 carry a powered lift fan system (e.g. gas turbine) for forming an air space between hulls 11, 12 and seals 16, 17. Such powered lift fan systems are known in the art.

Figure 11:
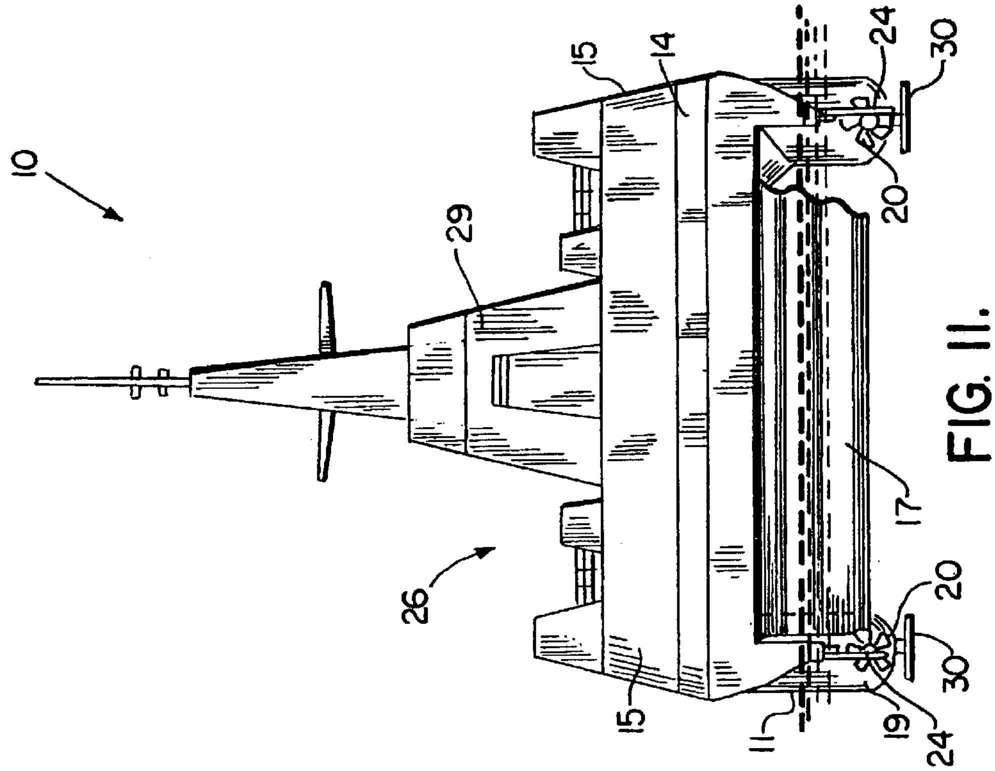
FIG. 11 is a rear view of the preferred embodiment of the apparatus of the present invention showing the displacement mode.
Figure 10:
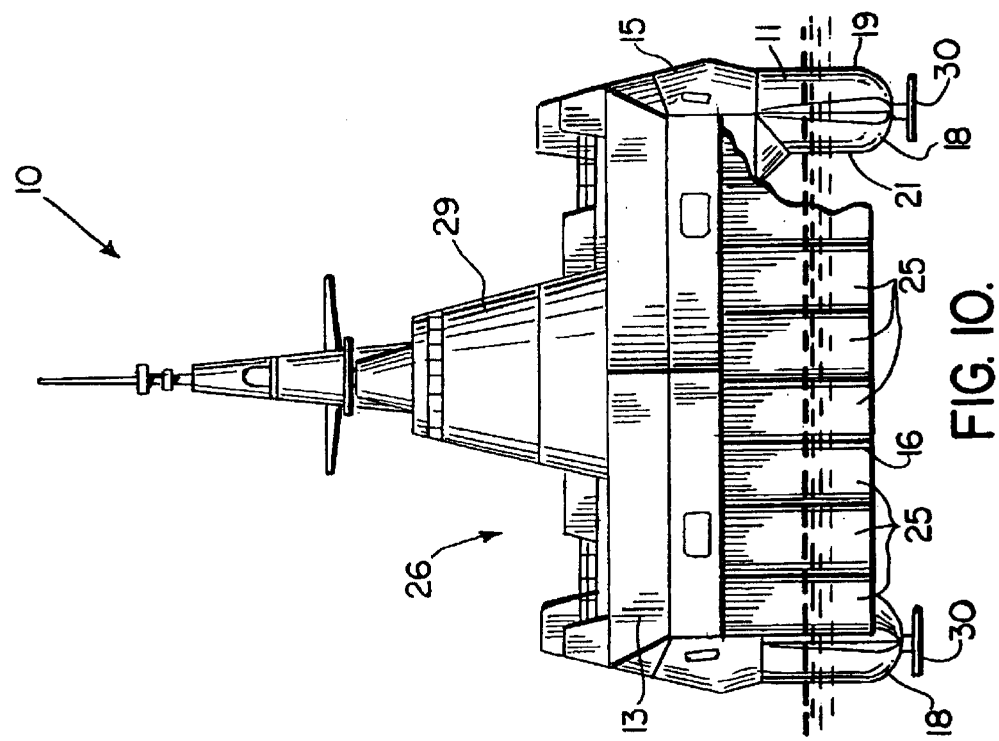
FIG. 10 is a front view of the preferred embodiment of the apparatus of the present invention showing the displacement mode.

Each hull 11, 12 can optionally be provided with foil stabilizers 30 (see, e.g., FIGS. 10 and 11). At bow 13, forward seal 16 can be in the form of a plurality of individual finger seals 25. Such a seal 16 can be seen for example in prior U.S. Pat. Nos. 3,621,932; 3,987,865; and 4,646,866, each incorporated herein by reference. Forward seal 16 includes preferably a plurality of between about four and ten (preferably eight) fingers or elements 25. These can be retracted when low speed operation (FIG. 2) is required. These fingers 25 can also be used to generate transverse roll forces to improve high speed maneuvering.

Figure 3:
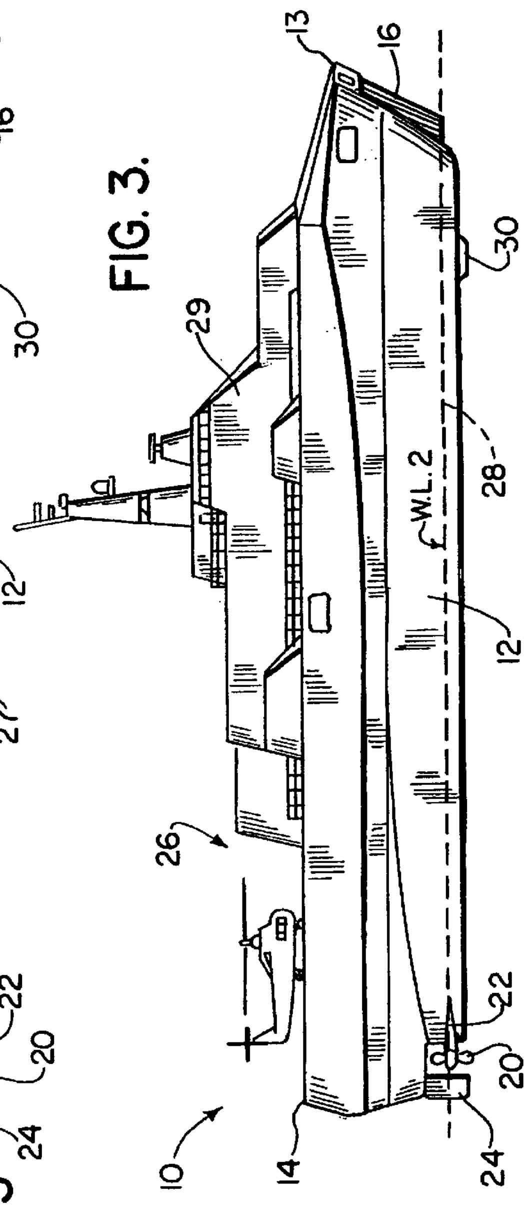
FIG. 3 is a side view of the preferred embodiment of the apparatus of the present invention showing the high speed, planing mode.
Figure 4:
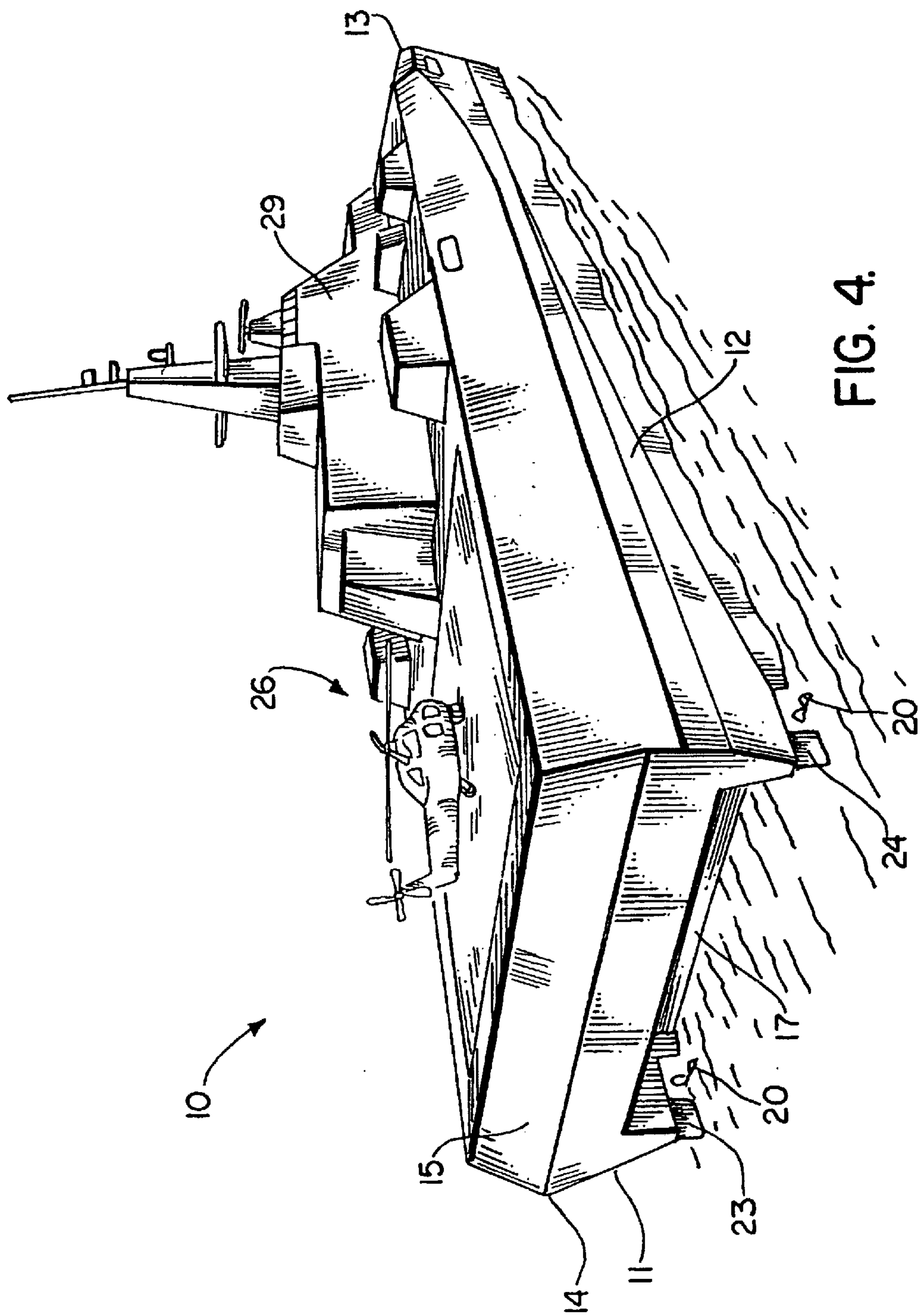
FIG. 4 is a rear perspective view of the preferred embodiment of the apparatus of the present invention showing the high speed, planing mode.

An aft seal 17 is provided at stern 14 as shown in FIG. 11. The forward and aft seals 16, 17 in combination with the catamaran hulls 11, 12 provide a space that can be pressurized with air for providing an air cushion that supports the ship 10 in a high speed mode shown in FIG. 3. In the mode of FIG. 3, the second water line 28 extends through the center of rotation of propellers 20, enabling the air cushion ship 10 of the present invention to attain high speeds of for example in excess of 50 knots (93 km/hour) with minimal resistance. Propellers 20 are designed to operate in a surface piercing mode and/or fully wetted mode (where the propellers 20 are typically fully submerged) and can for example be driven by a diesel or a gas turbine power plant or a combined diesel and gas turbine power plant.

In a slow travel mode of for example between about 0 and 20 knots (0 and 37 km/hour), vessel 10 can travel in a displacement mode that is shown in FIG. 2. That vessel 10 is in the displacement mode in FIG. 2 can be seen by observing first water line 27. In the displacement mode of FIG. 2, the propellers 20 are fully submerged as is each of the rudders 23, 24. In the displacement mode of FIG. 2, the forward and aft seals 16, 17 can be retracted or removed.

Figures 5, 6, 7, 8, 9:
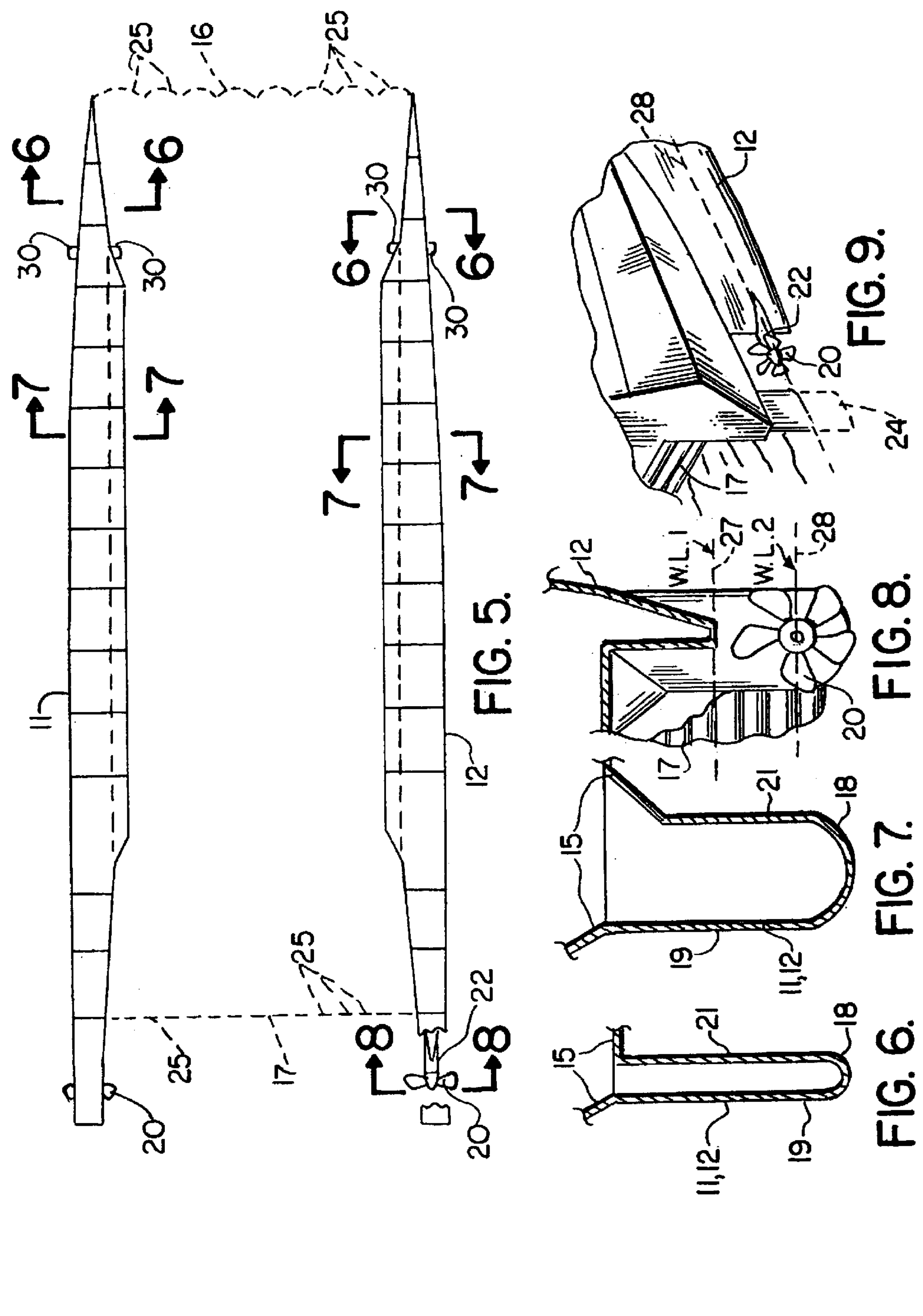
FIG. 5 is a sectional view taken along the lines 5—5 of FIG. 2.
FIG. 6 is a sectional view taken along the lines 6—6 of FIG. 5.
FIG. 7 is a sectional view taken along the lines 7—7 of FIG. 5.
FIG. 8 is a sectional view taken along the lines 8—8 of FIG. 5.
FIG. 9 is a fragmentary perspective view of the preferred embodiment of the apparatus of the present invention illustrating the propulsion system for one of the hulls.

In FIGS. 5–9, each of the hulls 11, 12 is a smooth hull providing a smooth outer surface that does not have any hard chines. Such a hull construction as shown in FIGS. 5–9 is very efficient at low speeds. Each of the port hull 11 and starboard hull 12 has a smooth curved bottom 18 and a pair of opposed smooth side walls 19, 21. The side walls 19, 21 include outer side wall 19 and inner side wall 21. The side walls 19, 21 can be generally vertically oriented as shown in FIGS. 6 and 7. These hulls 11, 12 preferably have parabolic waterlines.

A propeller shaft housing 22 that is tubular in shape can extend from the rear of each of the port and starboard hulls 11, 12 as shown in FIGS. 2, 3, 8, and 9. Each hull 11, 12 has its own surface piercing propeller 20. Port hull 11 provides port rudder 23. Starboard hull 12 provides starboard rudder 24.

A deck area 26 can be provided that includes a super structure 29. This deck area 26 can provide a hangar, flight deck, and a plurality of hatches to enable numerous uses for the ship. The present invention capitalizes on strengths of both the air cushion and catamaran types of vessels. It is able to operate efficiently at high speeds, but is also able to operate efficiently in the lower speed regime.

The hulls can be made of aluminum, steel, composite materials, or any other suitable material which will be apparent to those of ordinary skill in this art.

The following is a list of suitable parts and materials for the various elements of the preferred embodiment of the present invention.

PARTS LIST

| Parts Number | Description |
|---|---|
| 10 | hybrid catamaran air cushion ship |
| 11 | port hull |
| 12 | starboard hull |
| 13 | bow |
| 14 | stern |
| 15 | platform |
| 16 | forward seal |
| 17 | aft seal |
| 18 | curved bottom |
| 19 | outer side wall |
| 20 | propeller |
| 21 | inner side wall |
| 22 | propeller shaft housing |
| 23 | port rudder |
| 24 | starboard rudder |
| 25 | bow seal element |
| 26 | deck area |
| 27 | first water line (displacement mode) |
| 28 | second water line (planing mode) |
| 29 | superstructure |
| 30 | foil stabilizer |

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. A catamaran surface effect ship comprising a catamaran hull having a hull baseline, spaced apart hulls connected with a deck, and an integral propulsion system for propelling the hull, a) the hull having forward and aft flexible seals that enable pressured air to be trapped in an air space that is positioned generally in between the hulls and in between the seals, b) the hull containing a powered lift fan system for transmitting air to the air space, and c) wherein each hull is absent chines, providing a smoothly curved bottom and side walls extending upwardly from the smoothly curved bottom, wherein the propulsion system includes propellers, each propeller having a propeller shaft tube integral with the hull.

2. The catamaran surface effect ship of claim 1, wherein the propeller shaft tube does not extend below the baseline of the hull.

3. The apparatus of claim 1, further comprising a propeller shaft supporting each propeller wherein the propeller shaft is oriented nearly parallel to the ship's bottom.

4. The apparatus of claim 1, wherein the propeller has a shaft that is oriented above the ship's bottom.

5. The apparatus of claim 1, wherein the vessel has a dynamically supported draft that is much less than its static draft.

6. The apparatus of claim 1, wherein the catamaran hulls have parabolic waterlines.

7. The apparatus of claim 1, wherein the propulsion system includes combined diesel and gas turbine power generation units.

8. The apparatus of claim 1, further comprising gas turbines for generating lift air pressure.

9. The apparatus of claim 1, further comprising forward mounted foil stabilizers for facilitating ride stabilization and load compensation, at high and low speeds.

10. The apparatus of claim 9, wherein the foil stabilizers generate transverse roll forces that improve high speed maneuvering.

11. The apparatus of claim 1, further comprising a deck and superstructure on the hulls.

12. The apparatus of claim 1, wherein the hulls have smoothly curved bottom portions.

13. The apparatus of claim 1, wherein the hulls have smooth side portions.

14. The apparatus of claim 13, wherein the side portions are generally vertically oriented.

15. The apparatus of claim 1, wherein the hulls do not generate dynamic lifting forces.

16. The apparatus of a claim 1, wherein the hulls are non-lifting side hulls.

17. The apparatus of claim 16, wherein the side hulls are molded forms featuring parabolic waterlines and semi-elliptical cross sections to minimize the characteristic wave trains associated with low speed.

18. The apparatus of claim 1, wherein small lifting surfaces on the hulls provide load compensation, ride control and high-speed stabilization.

19. The apparatus of claim 18, wherein the small lifting surfaces comprise two independently controlled wing sections mounted port and starboard below the waterline, inboard and forward on the side hulls.

20. The apparatus of claim 1, wherein the air cushion seals are retractable.

21. Apparatus including a vessel designed to operate as both a catamaran and air cushion vessel comprising:

catamaran hulls that are without hard chines, for traveling at low speed in a displacement mode;

a propulsion system that includes one or more surface piercing propellers for operating at high speed in an air cushion, dynamically supported mode, wherein the propulsion system includes propellers, each having a propeller shaft tube integral with the hull.

22. The apparatus of claim 21, wherein the propeller shaft tube does not extend below the baseline of the hull.

23. The apparatus of claim 21, wherein low speed is travel at a Froude number between about 0 and about 0.3 and high speed is 50+ knots.

* * * * *